United States Patent Office 2,784,182
Patented Mar. 5, 1957

2,784,182
PROCESS OF PRODUCING ISONITRONES

Heinrich Krimm, Krefeld-Uerdingen, Karl Hamann, Stuttgart, and Kurt Bauer, Krefeld-Uerdingen, Germany, assignors to Farbenfabriken Bayer Aktiengesellschaft, Leverkusen, Germany, a corporation of Germany No Drawing. Application July 13, 1953,
Serial No. 367,748

7 Claims. (Cl. 260—239)

The present invention relates to a new class of organic compounds which contain the group

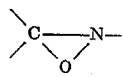

They are thus isomeric with the known nitrones or oxime-N-ethers which contain the group

For that reason the new compounds are called isonitrones. They differ, however, from the corresponding nitrones in their physical and chemical properties. The differences in the physical properties of the two groups of compounds are that the melting point and the boiling point of the isonitrones are generally lower, the characteristic group of the isonitrones in contrast to the characteristic group of the nitrones does not yield an exaltation of the molecular refraction and does not absorb in the ultra-violet region.

The isonitrones differ in their chemical behaviour from the nitrones especially in that the former contain active oxygen. The liberate therefore instantly, iodine quantitively in proportion to their content of active oxygen from a solution of acidified potassium iodide.

Like the nitrones, the isonitrones may be converted to the isomeric acid amides. Whereas, however, in the case of the nitrones the catalytic action of catalysts of the Beckmann conversion is necessary, the isonitrones may in general be converted quantitively by themeselves into acid amides by heating to somewhat elevated temperatures.

The following table gives examples of typical isonitrones together with their melting points and boiling points, in degrees centigrade.

|  | Boiling point | Melting Point, degrees |
|---|---|---|
| Methyl-N-isobutyl-isonitrone | 40-42°/32 mm. |  |
| n-propyl-N-methyl-isonitrone | 42-44°/32 mm. |  |
| n-propyl-N-isopropyl-isonitrone | 43-45°/13 mm. |  |
| n-propyl-N-cyclohexyl-isonitrone | 69°/0. 01 mm. |  |
| dimethyl-N-isopropyl-isonitrone | 58-59°/60 mm. |  |
| dimethyl-N-cyclohexyl-isonitrone | 72°/8 mm. |  |
| tetramethylene-N-cyclohexyl-isonitrone | 74-76°/0. 4 mm. |  |
| pentamethylene-N-isopropyl-isonitrone | 72-74°/8 mm. |  |
| pentamethylene-N-isobutyl-isonitrone | 55-57°/0. 6 mm. |  |
| pentamethylene-N-cyclohexyl-isonitrone | 102-104°/1. 5 mm. |  |
| di-pentamethylene-N,N'-ethylene-di-isonitrone |  | 106-107 |
| pentamethylene-N-phenyl-isonitrone |  | 75 |
| (3-methyl-pentamethylene)-N-phenyl-isonitrone |  | 65-66 |
| pentamethylene-N-(p-chlorophenyl)-isonitrone |  | 69-70 |
| phenyl-N-methyl-isonitrone | 70°/2. 5 mm. |  |
| methyl-phenyl-N-cyclohexyl-isonitrone | 118-120°/0. 8 mm. |  |
| phenyl-N-isopropyl-isonitrone | 65-67°/0. 9 mm. |  |
| α-furyl-N-methyl-isonitrone | 44-46°/0. 6 mm. |  |

The isonitrones may be produced for instance in the following ways:

Aldimines or ketimines obtained in a known manner by the condensation of aldehydes or ketones with ammonia or with primary amines, i. e. products which are also known as Schiff's bases or azomethines, are reacted with percompounds (e. g. hydrogen peroxide) or more especially with per-acids. There are thus formed, probably in an analogous manner to Prileschajeff's reaction, the isonitrones by one oxygen atom entering into one molecule of the imine.

Although the condensation of aldehydes and especially of ketones with primary amines leads only to equilibrium, fixation of the isonitrones does in many cases take place without difficulty and gives a good yield when instead of the pure imines, a mixture of an oxo-compound and a primary amine is reacted with a per-compound.

When a per-acid is used as per-compound there may be added to the preparation also alkaline substances such as soda or potash in order that the carboxylic acids which are formed in the reaction may be neutralized. This procedure is therefore advisable in all cases in which it is intended to produce acid sensitive isonitrones, for instance, isonitrones which are derived from aromatic amines.

In place of free ammonia and free primary amines there may be reacted also the salts thereof for instance, carbonates or acetates in the presence of oxo-compounds with per-compounds and isonitrones may thereby be obtained in good yield. This procedure is especially advantageous when it is intended to convert readily volatile bases such as ammonia, methylamine, ethylamine etc.

Finally it should be mentioned that a more or less high proportion of isonitrones may be obtained according to the reaction conditions by the oxidation of primary amines with per-compounds, other reaction products being obtained in the same reaction.

In the new process for the preparation of isonitrones it is advantageous to add equimolar proportions of imines or oxo-compounds and primary amines, and per-compounds.

It is, however, advisable in many cases to carry out the reactions in inert solvents for instance in benzine, methylene chloride, chloroform, carbon tetrachloride, ether, benzene or toluene.

The reaction may be accelerated by applying elevated temperatures and correspondingly increased pressures, whereby the upper limit of the pressure is determined by the resistance which the material of the vessel is capable of exerting. The temperatures during the conversion may vary according to conditions. The lower temperature limits are in general determined by the solidification point of the reaction mixture and the upper limits are determined by the decomposition point of the reaction mixture. Good results are obtained at temperatures ranging between about −20° C. and +50° C., the preferred range being between about 0 and about +20° C. However when the per-compound is used in the form of hydrogen peroxide it is necessary to apply higher temperatures which preferably lie between about 40° C. and 100° C.

When using hydrogen peroxide as the per-compound it is advantageous to add catalysts such as molybdenum dioxide or tungsten trioxide or such compounds which act as stabilizers for hydrogen peroxide in alkaline solution, e. g. magnesium hydroxide or alkali metal silicates such as sodium silicate.

The aldemines and ketimines suitable as starting materials for the production of isonitrones include for instance the condensation products of aldehydes (e. g. formaldehyde, acetaldehyde, propionaldehyde, n-butyraldehyde, isobutyraldehyde, isovaleraldehyde, heptaldehyde, palmitic aldehyde, glycol aldehyde, succinic dialdehyde, cyclohexylformaldehyde, phenylacetaldehyde, benzaldehyde, o-, m-, p-chlorobenzaldehyde, o-, m-, p-nitrobenzaldehyde, o-, m-, p-toluylaldehyde, α-, β- naphthaldehyde, furfural) or of ketones (e. g. acetone, methyl-ethyl-ketone, methyl-propyl-ketone, di-ethyl-ketone, methyl-heptyl-ketone, levulinic acid-ethyl-ester, levulinic acid, pinacoline, dimethyldiketone, acetylacetone, acetonylacetone, acetophenone, o-, m-, p-chloroacetophenone, benzophenone, cyclopentanone, cyclohexanone, 1-methylcyclohexanone-2, 1-cyclohexyl-cyclohexanone-2, 1-nitro-cyclohexanone-2, cyclohexanediketone-1-4, acetylocyclohexanone, musk ketone, camphor, menthon, α-hydrindone, α-tetralone, α-dekalone, anthrone, fluorenone, 2-acetylthiophene, 2-acetylfuran, xanthone, anthraquinone) or of ketone-aldehydes (e. g. levulinic aldehyde, methylglyoxal, phenylglyoxal) with ammonia or with primary amines (e. g. methylamine, ethylamine, isopropylamine, n-butylamine, sec-butylamine, tert-butylamine, isobutylamine, isoamylamine, dodecylamine, stearylamine, ethylenediamine, hexamethylenediamine, ethanolamine, glycocoll, alanine, ε-aminocaproic-acid, cyclophenylamine, cyclohexylamine, 2-methylcyclohexylamine, 4-methylcyclohexylamine, hexahydrobenzylamine, bornylamine, benzylamine, o-, m-, p-nitrobenzylamine, o-, m-, p-chlorobenzylamine, α- or β-phenetylamine, benzhydrylamine, aniline, o-, m-, p- toluidine p-xylidine mesidine, o-, m-, p-chloroaniline, o-, m-, p-nitroaniline, aminobenzylalcohol, 2-aminodiphenyl, α- or β-naphthylamine, 1-aminoanthracene, benzidine, p-aminophenol, p-anisidine, 1-aminonaphthol-2, 4-aminoacetophenone, 2-aminobenzophenone, 2-amino-anthraquinone, anthranilic acid, p-aminosalicyclic acid, furfurylamine, 2-aminothiophene, 2-aminothiazole).

Among the suitable per-compounds are mentioned hydrogen peroxide, Caro's acid, organic per-acids (e. g. peroxyformic acid, peroxyacetic acid, peroxypropionic acid, peroxybutyric acid, peroxybenzoic acid, mono-peroxyphthalic acid, peroxyfuroic acid) as well as mixtures of hydrogen peroxide with organic acids (e. g. hydrogen peroxide with formic acid or glacial acetic acid).

From such starting materials there may be obtained isonitrones of the aliphatic, cycloaliphatic, aromatic and heterocyclic series.

The isonitrones are capable of manifold applications and are especially suitable for the production of organic intermediates.

The conditions for the above mentioned conversion of the isonitrones into amides, especially the reaction temperature, depend on the constitution of the relevant isonitrones and may be readily determined by simple experiments. Some nitrones, for instance the pentamethylene-N-phenyl isonitrone, change even at room temperature into the corresponding acid amides. In general the conversion may be carried out between about room temperature and about 250° C. and at the corresponding pressures which are given by the specific nature of the nitrones used in any particular case. Since there is, in general, a considerable quantity of heat liberated in the conversion, it is advisable to use the isonitrones not by themselves but in the form of solutions in such solvents having such elevated boiling points that the conversion readily takes place at boiling temperature. It is not necessary to use pure isonitrones since the crude reaction mixtures which are obtained in the manufacture of the isonitrones are suitable for this conversion. Solvents of the above mentioned type include for instance benzine, methylene chloride, chloroform, carbon tetrachloride, benzene, toluene, xylene, chlorobenzene, nitrobenzene, cyclohexane, tetraline, decaline, ether, dioxan and anisole.

*Example 1*

99 g. (1 mol) ethylidene-isobutyl-amine (boiling point 92–93° C.) in 500 cc. of ether are reacted drop by drop with stirring at 0° C. inner temperature with 90 g. of a 85 percent peracetic acid (1 mol). After about an hour further stirring at room temperature neutralization is carried out with 30 percent aqueous potassium carbonate solution. The ether solution is dried for two hours over potassium carbonate free from water and the solvent is removed under slightly sub-atmospheric conditions. After a short forerun the reaction product distills over as a colourless liquid having a boiling point of 40–42°/32 mm. The yield of methyl-N-isobutyl-isonitrone amounts to 47 g. (41 percent of theory). The compound has the formula

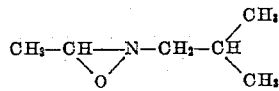

$C_6H_{13}ON$ (115.1). Calculated: C 62.60, H 11.38, N 12.16. Found: C 63.67, H 11.67, N 11.50.

*Example 2*

72 g. (1 mol) n-butyraldehyde are added drop by drop whilst stirring at −20° C. to −10° C. inner temperature to a solution of 59 g. (1 mol) isopropylamine in 200 ccs. of ether. After one hour there are added in a similar manner 100 g. 76 percent per-acetic acid (1 mol); after 3 hours standing at room temperature neutralization is carried out with 30 percent potassium carbonate solution. Drying is effected over potassium carbonate free from water, the ether distilled at normal pressure and the isonitrone thus formed is distilled in a water jet vacuum. There are obtained 92 g. of a colourless liquid having a boiling point of 43–45° C./13 mm. The yield of n-propyl-N-isopropyl-isonitrone amounts to 71 percent of theory. The compound has the formula

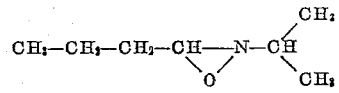

$C_7H_{15}ON$ (129.2). Calculated: C 65.07, H 11.70, N 10.84. Found: C 65.30, H 11.89, N 10.35.

The corresponding nitrone from equimolar proportions of n-butyraldehyde and N-isopropyl-hydroxylamine boils at 87–89° C./9 mm.

*Example 3*

To a solution of 198 g. (2 mols) cyclohexylamine in 400 ccs. ether are added drop by drop with stirring at an inner temperature lying between −20 and −10° C., 144 g. (2 mols) n-butyraldehyde. After one hour there are added similarly 207 g. 73.4 percent per-acetic acid (2 mols). After five hours standing at room temperature neutralization is carried out by means of ice cold 30 percent potassium carbonate solution and drying is carried out over solid potassium carbonate. After removal of the solvent in vacuum, the n-propyl-N-cyclohexyl-isonitrone distils at 78–80° C./0.8 mm. The yield amounts to 220 g. (65 percent of the theory).

The compound has the formula

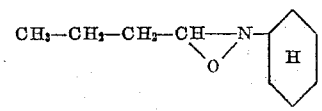

$C_{10}H_{19}ON$ (169.3). Calculated: C 70.96, H 11.32, N 8.28. Found: C 71.15, H 11.45, N 8.44.

The corresponding nitrone obtained from n-butyraldehyde and N-cyclohexyl-hydroxylamine boils at 103–104° C./0.02 mm.

34 g. of the isonitrone are warmed in a 2 litre flask with a wide tall mounting duct until the violent conversion reaction starts. The dark reaction product is then distilled by fractionation. At 90–95° C./0.8 mm. are obtained 14.5 g. of a liquid fraction and at 135–139° C./0.7 mm. there are obtained 12.5 g. of a solidifying fraction. The crystalline fraction is identical with the reaction product obtained from butyrylchloride and cyclohexylamine and thus consists of N-cyclohexyl-n-butyramide having a melting point of 62–63° C. The liquid fraction which is isomeric with the crystalline fraction consists of N-formyl-N-n-propyl-cyclohexylamine. By saponification with 20 percent hydrochloric acid there is obtained therefrom a base similar to that obtained by hydrogenating N-n-propyl-aniline.

*Example 4*

To a solution of 148 g. (2.5 mol) isopropylamine in 1 litre of acetone free from water, to which is added 250 g. sodium carbonate free from water are added with stirring at —20 to 0° C. inner temperature 225 g. 84 percent per-acetic acid (2.5 mols). After a further 20 hours stirring at room temperature the sodium carbonate formed is removed with suction and washed out with acetone. The acetone solution is dried over potassium carbonate, the excess of acetone is removed in vacuum and the isonitrone a colourless liquid is distilled at 58–59° C./60 mm. The yield of dimethyl-N-isopropyl-isonitrone amounts to 170 g. (59 percent of theory).

The compound has the formula

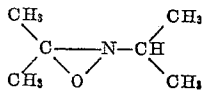

$C_6H_{13}ON$ (115.2). Calculated: C 62.57, H 11.38, N 12.16. Found: C 62.31, H 11.41, N 12.09.

*Example 5*

165 g. (1 mol) cyclopentylidene-cyclohexylamine (boiling point 92° C./3 mm.) in 400 ccs. of ether are reacted with 90 g. 85 percent per-acetic acid (1 mol) with stirring at 0° C. After 24 hours standing at room temperature the solution is neutralised with 30 percent potassium carbonate and dried over potassium carbonate. The solvent is removed and the isonitrone is distilled at 74–76° C./0.4 mm. The yield of tetramethylene-N-cyclohexyl-isonitrone amounts to 157 g. (87 percent of theory).

The compound has the formula

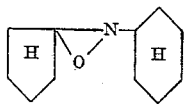

$C_{11}H_{19}ON$ (181.3). Calculated: C 72.87, H 10.56, N 7.72. Found: C 72.63, H 10.54, N 7.71.

*Example 6*

179 g. (1 mol) cyclohexylidene-cyclohexylamine (boiling point 82–84° C./0.6 mm.) in 400 ccs. of ether are reacted with stirring at 5° C. inner temperature with 90 g. 85 percent per-acetic acid (1 mol). After standing at room temperature for five hours neutralization with 30 percent potassium carbonate solution is carried out, and drying is effected over sodium sulphate. After distilling off the solvent the pentamethylene-N-cyclohexyl-isonitrone a colourless liquid distils at 102–104° C./1.5 mm. The yield amounts to 166 g. (85 percent of theory).

The compound has the formula

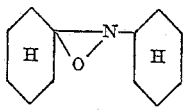

$C_{12}H_{21}ON$ (195.3). Calculated: C 73.80, H 10.84, N 7.17. Found: C 74.03, H 10.76, N 7.17.

A solution of 98 g. of the isonitrone in 150 ccs. tetraline is heated in a 2 litre flask to which has been connected a mounting duct until the violent conversion reaction starts. After the reaction has subsided the reaction product is distilled at 130–132° C./0.4 mm. There is obtained thereby the as yet not described N-cyclohexyl-caprolactam. Melting point 52–53° C. The yield amounts to 83 g. (85 percent of theory).

$C_{12}H_{21}ON$ (195.3). Calculated: C 73.80, H 10.84, N 7.17. Found: C 73.81, H 10.78, N 7.26.

*Example 7*

To a mixture of 98 g. (1 mol) cyclohexanone, 159 g. (1 mol) cyclohexylaminoacetate and 250 ccs. of ether there are added with stiring at 0–10° C. inner temperature 98 g. 85 percent per-acetic acid (1 mol). After 24 hours standing at room temperature neutralization is carried out by washing with 35 percent potassium carbonate solution. Drying carried out over potassium carbonate is followed by distillation. There are obtained at 90–92° C./0.3 mm. 164 g. of pentamethylene-N-cyclohexyl-isonitrone (84 percent of theory).

*Example 8*

To a mixture of 99 g. (1 mol) cyclohexylamine and 100 g. sodium carbonate free from water are added 98 g. (1 mol) cyclohexanone whereby the temperature rises to 30–40° C. After cooling to room temperature dilution is carried out with 250 ccs. of ether and the product is reacted with stirring at 0° C. inner temperature with 106 g. 72 percent per-acetic acid (1 mol). After 24 hours stirring at room temperature the salts are dissolved by the addition of water, and the ether solution is dried over potassium carbonate. The ether is removed and the pentamethylene-N-cyclohexyl-isonitrone is distilled at 95–98° C./0.6 mm. The yield amounts to 174 g. (89 percent of theory).

*Example 9*

To a mixture of 49 g. (½ mol) cyclohexanone, 49.5 g. (½ mol) cyclohexylamine and 1 g. magnesium hydroxide are added drop by drop with stirring 57 g. 30 percent hydrogen peroxide (½ mol) whereby the temperature rises to 100° C. After a further three hours heating to boil, the cooled reaction mixture is etherified out. After distillation of the ether solution dried over sodium sulphate, there are obtained at 100–104° C./1.2 mm. 30 g. of pentamethylene-N-cyclohexyl-isonitrone. The yield amounts to 31 percent of theory.

*Example 10*

153 g. (1 mol) cyclohexylidene-isobutylamine (boiling point 92–94° C./20 mm.) in 400 ccs. of ether are reacted at 0° C. inner temperature with stirring with 90 g. 85 percent per-acetic acid (1 mol). After 10 hours standing at room temperature neutralization is carried out with 30 percent potassium carbonate and drying is effected over potassium carbonate. After removal of the ether the pentamethylene-N-isobutyl-isonitrone distils at 55–57° C./0.6 mm. The yield amounts to 150 g. (89 percent of theory).

The compound has the formula

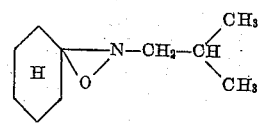

$C_{10}H_{19}ON$ (169.3). Calculated: C 70.95, H 11.31, N 8.27. Found: C 71.35, H 11.43, N 8.28.

*Example 11*

To a solution of 60 g. (1 mol) ethylenediamine in 600 ccs. of ether to which has been added 140 g. potassium carbonate free from water, there are added drop by drop with stirring at 0–5° C. inner temperature 196 g. (2 mol) cyclohexanone. After two hours standing are added with stirring at —10 to 0° C. inner temperature drop by drop 200 g. 76 percent per-acetic acid (2 mol). After 30 hours stirring at room temperature cooling is effected to —20° C. The crystalline mass which has precipitated is sucked off and washed with water. After drying there are obtained 96 g. of the di-pentamethylene-N-N'-ethylene-di-isonitrone having a melting point of 105–106° C. which after recrystallisation from ether or benzine containing light fractions melts at 106–107° C. The yield amounts to 39 percent of theory.

The compound has the formula

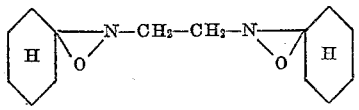

$C_{14}H_{24}O_2N_2$ (252.3). Calculated: C 66.63, H 9.59, N 11.10. Found: C 66.39, H 9.65, N 11.10.

*Example 12*

80 g. (½ mol) cyclopentylidene-aniline (boiling point 86–90° C./0.4 mm.) in 250 ccs. of ether are reacted drop by drop at —20° C. to —10° C. with 50 g. 76 percent per-acetic acid (½ mol) with stirring. After one hour a dark brown solution which contains the tetramethylene-N-phenyl-isonitrone is shaken neutral with ice cold potassium carbonate, dried for one hour in potassium carbonate free from water and freed from the solvent in vacuum. The ether residue is heated in a 2 litre flask to which a mounting duct has been connected until the exothermic conversion reaction takes place. By distillation of the dark coloured reaction product there are obtained at 135–138° C./0.6 mm. 27 g. N-phenyl-piperidone-2, having a melting point of 99–100° C. The yield is 31 percent of theory.

The constitution of the compound is confirmed by determination of the melting point of a mixture with N-phenyl-piperidone-2 obtained by partial electrolytic reduction of N-phenyl-glutarimide according to Buhei Sakurai (Ref. Chem. Abstr. 32, 8281 (1938)).

*Example 13*

58 g. (⅓ mol) cyclohexylidene-aniline (boiling point 150–152° C./21 mm.) in 200 ccs. of ether to which have been added 50 g. potassium carbonate free from water are reacted with stirring at 0° C. inner temperature with 26.7 g. 95 percent per-acetic acid (⅓ mol). After one hour stirring at room temperature the salts are brought into solution by the addition of water. The ether solution is dried with potassium carbonate and the ether is removed in vacuum. There is obtained in practically quantitative proportion the pentamethylene-N-phenyl-isonitrone which melts after recrystallisation from benzine containing light fractions at 75° C. The product has the odour characteristic of quinone and is explosive.

The compound has the formula

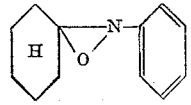

$C_{12}H_{15}ON$ (189.3). Calculated: C 76.15, H 7.99, N 7.40. Found: C 76.33, H 8.17, N 7.57.

6.5 g. of the isonitrone are heated to the boiling point in 60 ccs. of xylene in a flask to which a cooler has been connected until the conversion reaction starts. After distilling off the solvent the N-phenyl-caprolactam which has been formed remains as a crystalline mass. By distillation at 150° C./1.2 mm. are obtained 5 g. of the pure N-phenyl-caprolactam. Melting point 75° C.

$C_{12}H_{15}ON$ (189.3). Calculated: C 76.15, H 7.99, N 7.40. Found: C 76.17, H 8.15, N 7.36.

*Example 14*

21 g. of cyclohexylidene-p-chloroaniline (boiling point 108–110° C./0.2 mm.) in 150 ccs. of ether are reacted at —20° to —15° C. with stirring with 10 g. 76 percent per-acetic acid. After one hour standing at 0° C. the brown solution is washed with cold potassium carbonate solution and dried over potassium carbonate. After removal of the solvent in vacuum are obtained 70 g. of crystallised pentamethylene - N - (p-chlorophenyl)-isonitrone which may be purified by recrystallisation from ether or from benzine containing light fractions with addition of animalic charcoal. Melting point 69–70° C. The compound has the formula

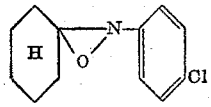

$C_{12}H_{14}ONCl$ (223.7). Calculated: C 64.43, H 6.31, N 6.26. Found: C 64.69, H 6.40, N 6.86.

When heating 10 g. of the isonitrone in 50 ccs. of xylene with reflux until the conversion reaction starts there are obtained after distillation 9 g. of the N-(p-chlorophenyl)-caprolactam (boiling point 170–172° C./0.8 mm.). Melting point 68–69° C.

$C_{12}H_{14}ONCl$ (223.7). Calculated: C 64.43, H 6.31, N 6.26. Found: C 65.20, H 6.67, N 6.99.

*Example 15*

A solution of 119 g. (1 mol) benzylidenemethylamine (boiling point 72–73° C./13 mm.) in 500 ccs. benzene is reacted with stirring at an inner temperature of 15 to 20° C. with 140 g. 74 percent perbutyric acid (1 mol). After 20 hours standing at room temperature neutralization is carried out with 30 percent potassium carbonate solution. The benzene layer is dried over potassium carbonate and the solvent is removed in vacuum. The phenyl-N-methyl-isonitrone distils at 70° C./2.5 mm. The yield amounts to 88 g. (65 percent of theory).

The compound has the formula

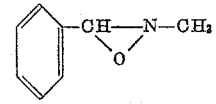

$C_8H_9ON$ (135.2). Calculated: C 71.09, H 6.71, N 10.36. Found: C 71.36, H 6.72, N 9.85.

The corresponding nitrone obtained from benzaldehyde and N-methylhydroxylamine melts at 84–86° C. and boils at 125° C./1 mm.

*Example 16*

100 g. (½ mol) α-methyl-benzylidene-cyclohexylamine (boiling point 112–114° C./0.6 mm.) in 500 ccs. of ether are reacted at —10° C. to 0° C. inner temperature with 45 g. 85 percent per-acetic acid (½ mol). After two hours standing at room temperature washing is carried out with 30 percent potassium carbonate solution and drying is effected over potassium carbonate. By distillation of the reaction product freed from the solvent are obtained at 118–120° C./8 mm. 66 g. of methyl-phenyl-N-cyclohexyl-isonitrone. The yield amounts to 61 percent of theory.

The compound has the formula

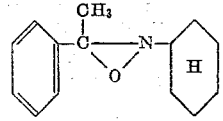

$C_{14}H_{19}ON$ (217.3). Calculated: C 77.38, H 8.81, N 6.45. Found: C 77.91, H 8.99, N 6.44.

*Example 17*

109 g. (1 mol) furfurylidene-methylamine (boiling point 58° C./17 mm.) in 500 ccs. of ether are reacted at 0° C. inner temperature with 88 g. 86 percent per-acetic acid (1 mol). After 2 hours standing whereby the solution reaches room temperature neutralization is effected with 30 percent potassium carbonate solution and the ether solution is dried for 2 hours over potassium carbonate. The α-furyl-N-methyl-isonitrone a colourless liquid is freed from the solvent in vacuum and is distilled at 44–46° C./0.6 mm. The yield amounts to 66 g. (53 percent of theory).

The compound has the formula

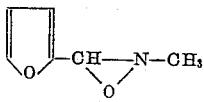

We claim:

1. A process for producing isonitrones which comprises reacting an imine produced in situ from a mixture of an oxo-compound and a primary amine with a per-compound selected from the group consisting of hydrogen peroxide, organic per-acids and persulfuric acid.

2. Process for producing isonitrones which comprises reacting a member of the group consisting of aldimines and ketimines with a per-compound.

3. Process for producing pentamethylene-N-cyclohexyl-isonitrone which comprises reacting cyclohexylidenecyclohexylamine dissolved in ether with per-acetic acid.

4. Process for producing isonitrones which comprises reacting a mixture of an oxo-compound and a primary amine with a per-compound.

5. Process for producing n-propyl-N-isopropyl-isonitrone which comprises reacting a mixture of n-butyraldehyde and isopropylamine with per-acetic acid.

6. Process for producing dimethyl - N - isopropyl-isonitrone which comprises reacting a mixture of isopropylamine and acetone with per-acetic acid.

7. Process for producing pentamethylene-N-cyclohexyl-isonitrone which comprises reacting a mixture of cyclohexanone and cyclohexylamine acetate with per-acetic acid.

References Cited in the file of this patent

UNITED STATES PATENTS

| | | |
|---|---|---|
| 2,206,273 | Ulrich | July 2, 1940 |
| 2,221,369 | Cass | Nov. 12, 1940 |
| 2,297,520 | Wiest et al. | Sept. 29, 1942 |

OTHER REFERENCES

Beilstein Handbook, 4th ed., vol. 27, pp. 1–2 (1937).
Houben: Die Methoden der org. Chem., vol. 2, pp. 182, 408–9 (Edwards Brothers, 1943).
Staudinger et al.: Chem. Abst., vol. 14, pp. 1971–2 (1920).
Exner: Chem. Abst., vol. 47, cols. 5884–5 (1953). Abstract of 1951 article.
Botvinnik: Chem. Abst., vol. 41, col. 2003 (1947).
Witkop et al.: Liebig's Ann., vol. 558, pp. 91–8 (1947).